(12) United States Patent
Badillo et al.

(10) Patent No.: US 7,300,381 B2
(45) Date of Patent: Nov. 27, 2007

(54) METHOD FOR MANAGING ENGINE TORQUE DURING A GEAR SHIFT IN AN AUTOMATIC SHIFT MANUAL TRANSMISSION

(75) Inventors: Edward Badillo, Flat Rock, MI (US); Ace K. Kue, Franklin, MI (US); David Oshinsky, Trenton, MI (US); David George Farmer, Plymouth, MI (US); Donald Fenwick Dickison, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/307,234

(22) Filed: Nov. 30, 2002

(65) Prior Publication Data

US 2004/0106498 A1 Jun. 3, 2004

(51) Int. Cl.
*F16H 59/74* (2006.01)
(52) U.S. Cl. ............... 477/102; 477/101; 477/105; 477/107; 477/109
(58) Field of Classification Search ............... 477/109, 477/107, 101, 102, 103, 104, 105, 106; 123/396; 701/54, 110
See application file for complete search history.

(56) References Cited

U.S. PATENT DOCUMENTS

| | | | |
|---|---|---|---|
| 4,938,100 A * | 7/1990 | Yoshimura et al. ......... 477/101 |
| 4,993,283 A * | 2/1991 | Kikuchi et al. ............. 477/96 |
| 5,595,551 A * | 1/1997 | Hedstrom et al. .......... 477/109 |
| 5,609,548 A | 3/1997 | White et al. |
| 5,638,271 A | 6/1997 | White et al. |
| 5,819,714 A * | 10/1998 | Bush et al. .................. 123/673 |
| 5,876,301 A * | 3/1999 | Tabata et al. ............... 477/109 |
| 5,884,201 A | 3/1999 | Kawai |
| 6,006,620 A | 12/1999 | Lawrie et al. |
| 6,024,669 A * | 2/2000 | Iwatsuki et al. ............ 477/107 |
| 6,258,009 B1 | 7/2001 | Thomas et al. |
| 6,285,940 B1 | 9/2001 | Henneken et al. |
| 6,295,884 B1 | 10/2001 | Miyake et al. |
| 6,497,214 B2 * | 12/2002 | Yagi ........................... 123/399 |
| 6,544,142 B2 * | 4/2003 | Kobayashi .................... 477/54 |
| 6,656,090 B2 * | 12/2003 | Matsumura et al. ........ 477/171 |
| 6,687,591 B2 * | 2/2004 | Abe ............................ 701/54 |
| 6,688,282 B1 * | 2/2004 | Okubo et al. .......... 123/339.11 |

* cited by examiner

*Primary Examiner*—David D. Le
(74) *Attorney, Agent, or Firm*—Diana D. Bredliob; Allen J. Lippa

(57) ABSTRACT

A method and system for controlling output torque of an internal combustion engine during a gearshift in an automatic shift manual transmission coupled to the engine is disclosed. The transmission includes a multiplicity of gears and a clutch actuated by a transmission control unit (TCU), which controls clutch disengagement, gear change, and clutch re-engagement. The engine includes an engine control unit in communication with the TCU. The method includes determining engine operator demanded engine torque; sending a signal to the engine control unit in response to actuation of the clutch; and, computing in the engine control unit in response to the sent clutch actuation signal and the determined engine operator demanded engine torque, a control signal for the engine, such engine, in response to such control signal changing engine torque during the gear change to substantially match demanded engine torque when the clutch is re-engaged.

37 Claims, 13 Drawing Sheets

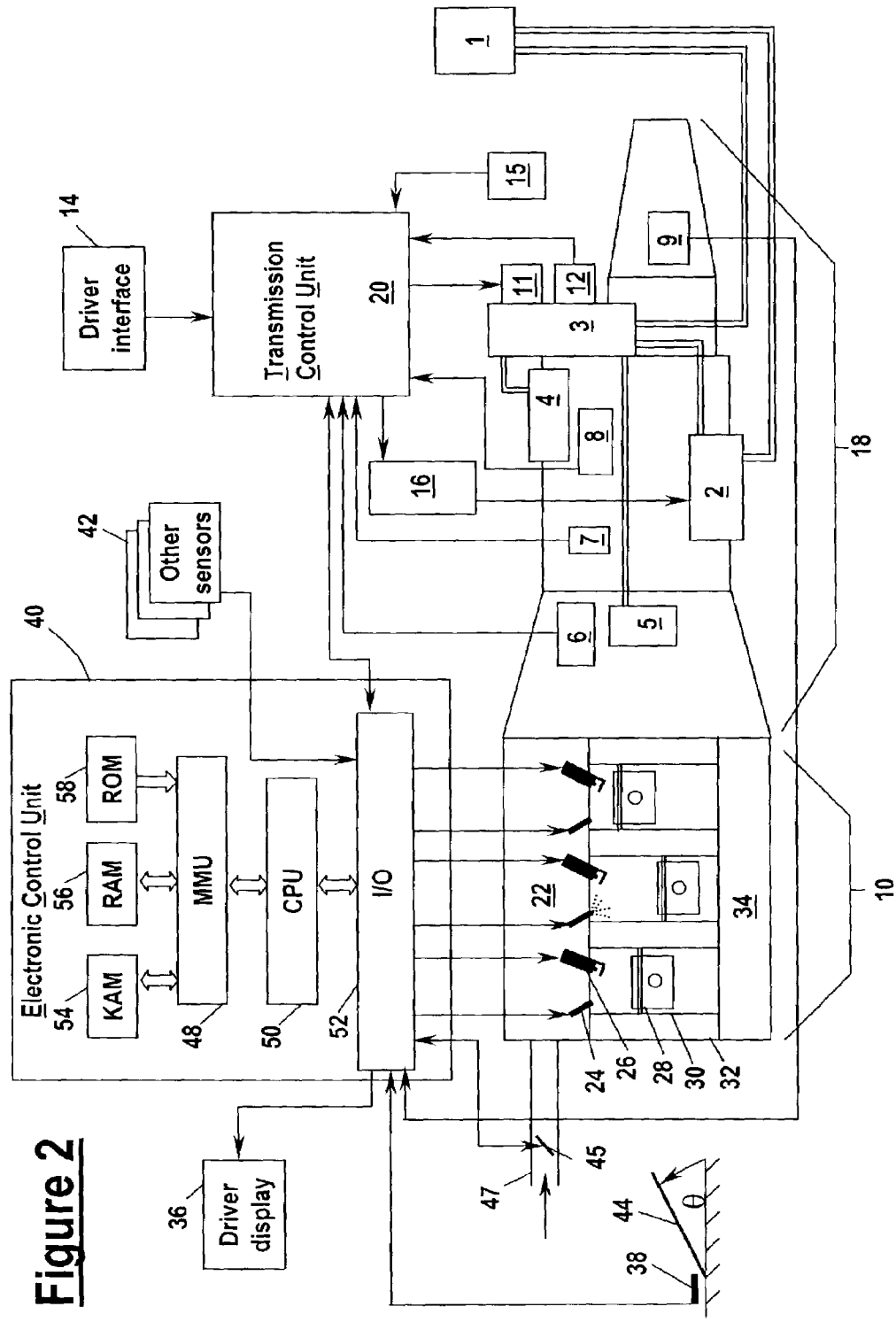

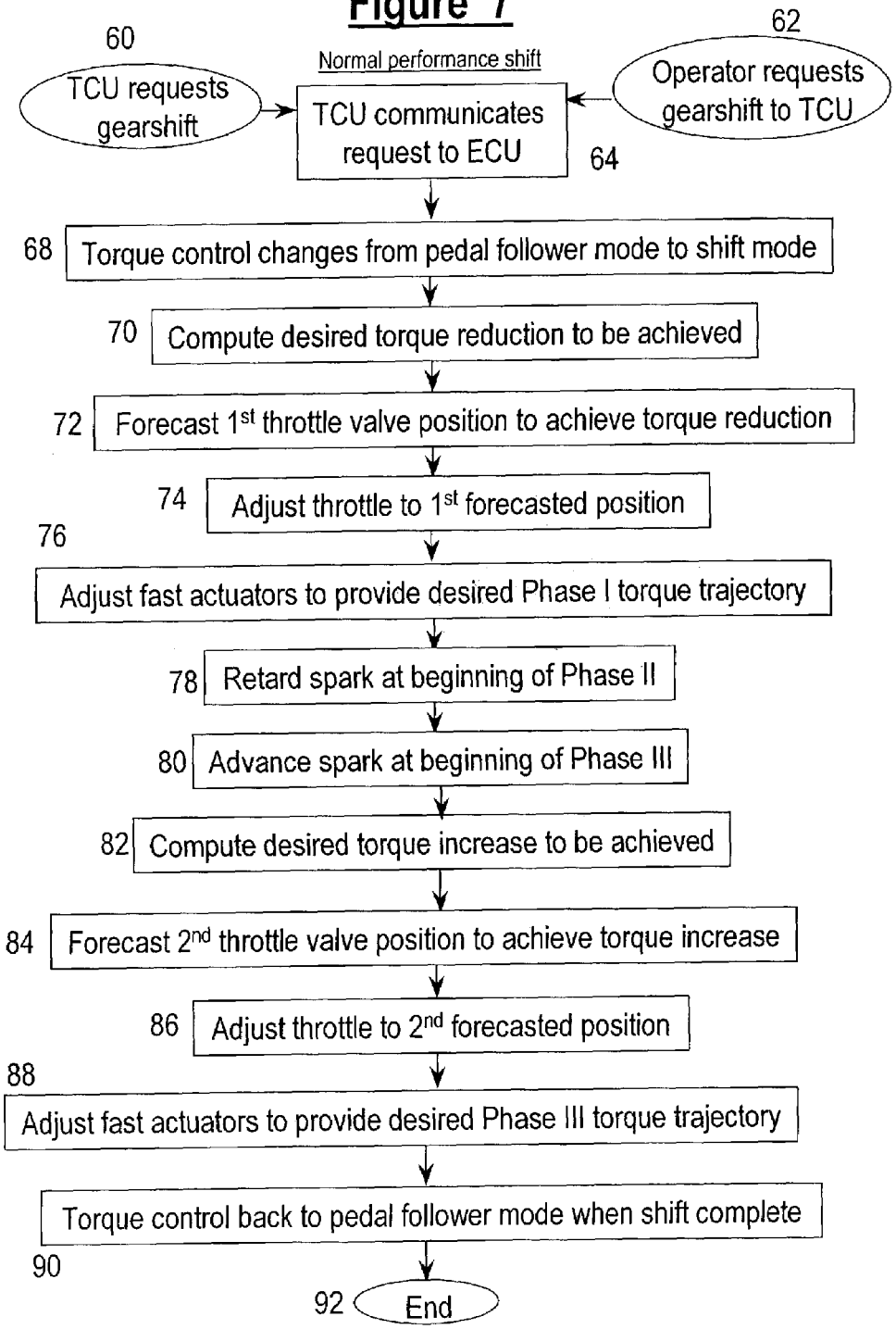

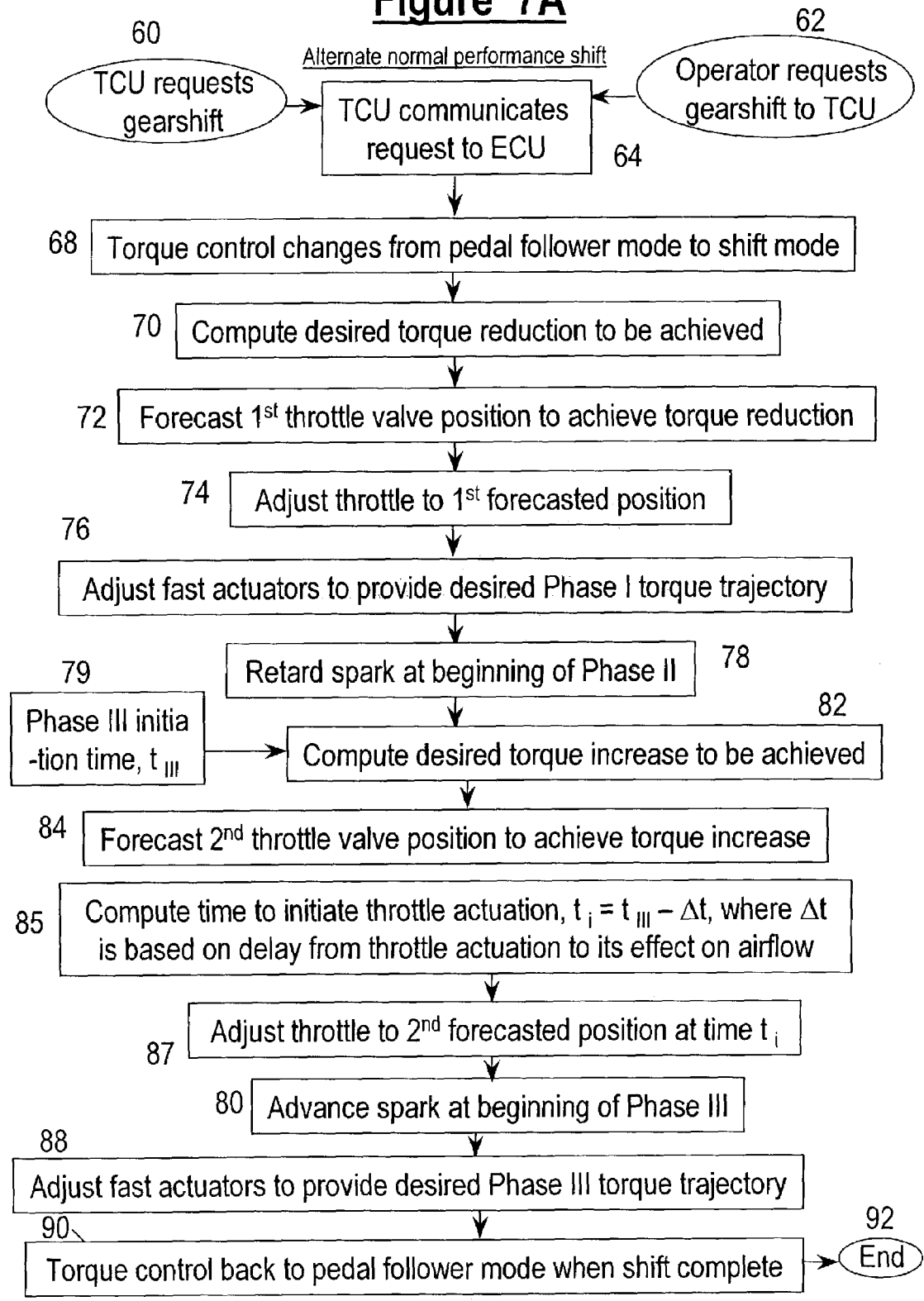

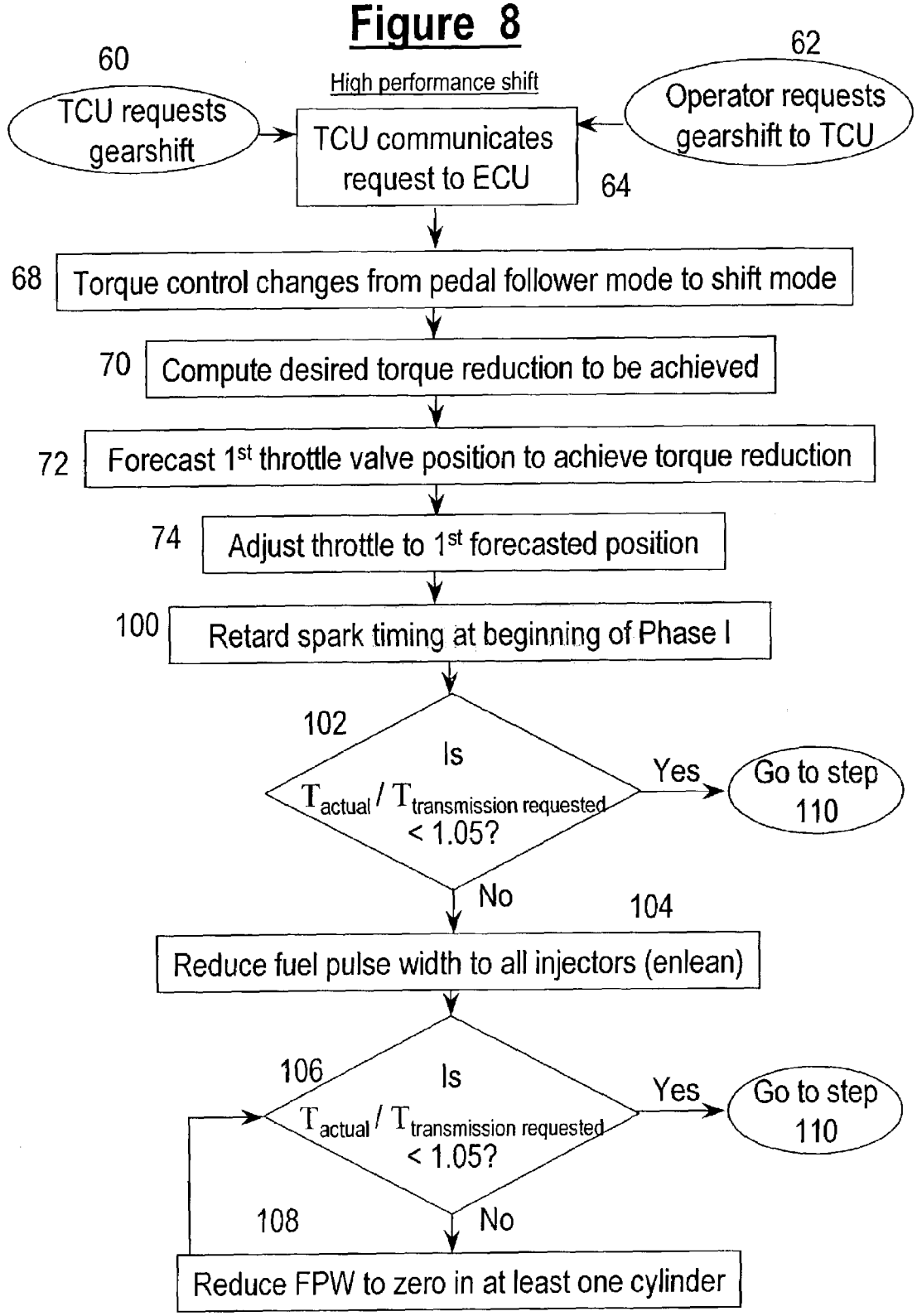

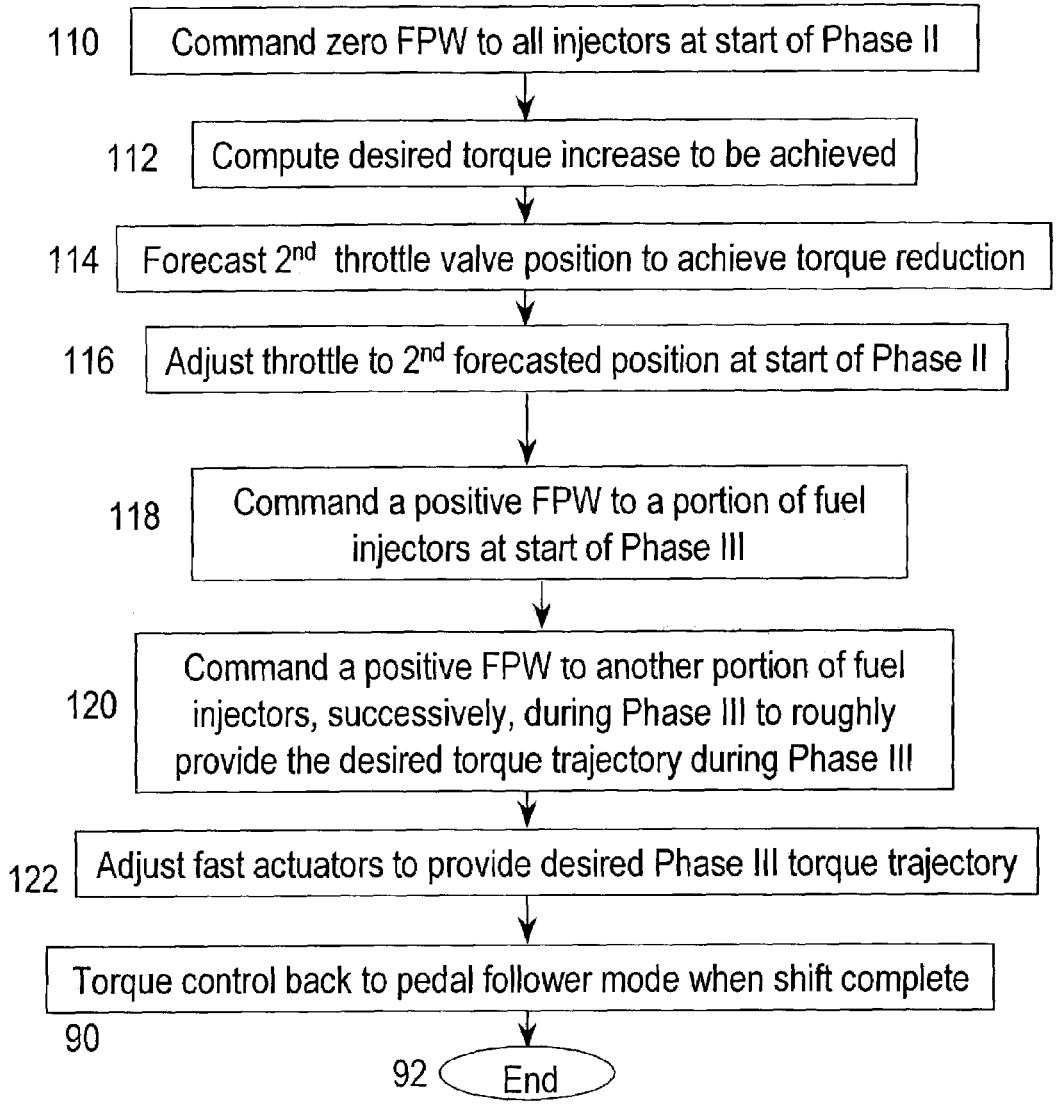

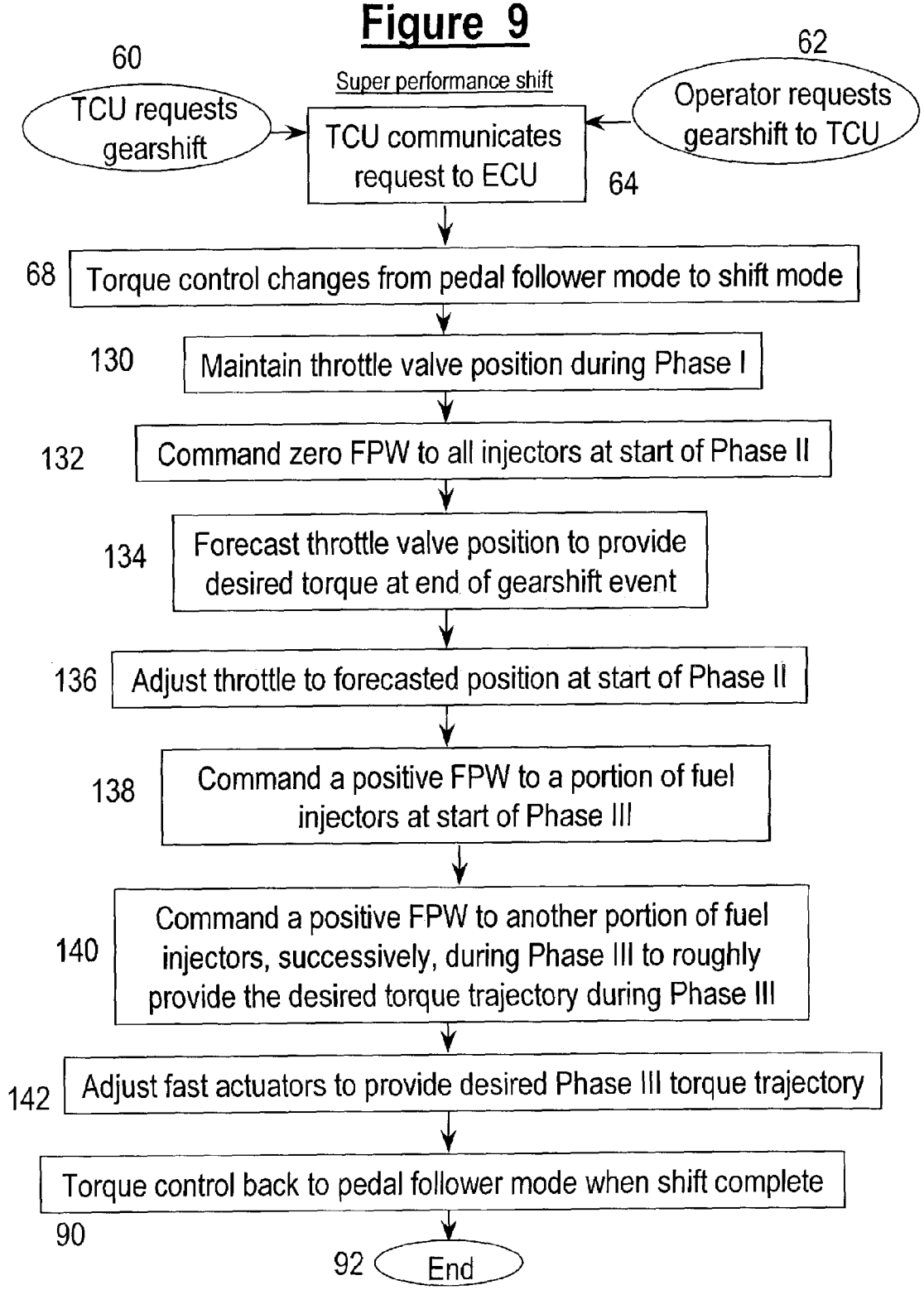

METHOD FOR MANAGING ENGINE TORQUE DURING A GEAR SHIFT IN AN AUTOMATIC SHIFT MANUAL TRANSMISSION

FIELD OF INVENTION

The present invention relates to a system and a method for managing engine torque during gear changes in an engine equipped with an automatic shift manual transmission wherein driver requested gear changes are performed by high-speed electro-hydraulic linkages.

BACKGROUND OF THE INVENTION

As is known in the art, with a vehicle equipped with a manual transmission, during a typical, driver-actuated gearshift event, the driver himself/herself matches the torque during the phases of the shift by adjusting the accelerator pedal position. The pedal position actuates either mechanically or electronically, the intake throttle valve.

As is also known in the art, with an Automatic Shift Manual (ASM) transmission the traditional manual gearshift lever is replaced with operator hand-operated up-shift and down-shift paddles which are part of a driver interface. The ASM transmission uses a sophisticated electromechanical control system to eliminate clutch pedal control by the operator of the vehicle completely. More particularly, with an ASM transmission, the driver makes gear selections with the easy-to-operate electronic paddles while the vehicle's control system executes the driver's decision. During such execution, the system co-ordinates all gear-change events including engine torque ramp-down and ramp-up. Thus, an ASM transmission is an automatic manual gearbox because the mechanical linkages, which would commonly be controlled by the operator of the vehicle in a manual transmission, are supplanted by high-speed electrohydraulic actuators.

There are two operator selectable modes by which an ASM transmission can operate: (1) An Operator Select-ASM (OS-ASM) mode; and (2) an Automatic Select-ASM (AS-ASM). The particular mode is selected by the operator by pressing one of a pair of operator hand-operated buttons which are also part of the driver interface. In the OS-ASM mode the operator depresses the appropriate up-shift or downshift paddle to indicate a desire for a gear shift; in the AS-ASM mode the demand for a gearshift is not under the operator's control but rather under control of the system itself. For example, in the AS-ASM mode, the demand for a gearshift is produced by an engine control unit and is computed as a function of driver demanded torque and engine operating conditions.

In the prior art, the ASM gearshift event is performed analogously to that of a manual transmission except that the engine control unit aboard the vehicle controls the intake throttle valve position and spark timing. A gearshift as a function of time, according to the prior art, is shown in FIG. 1. The control mode is shown along the top. During pre-shift, the engine is controlled by a pedal follower mode wherein engine parameters are controlled by an engine control unit (ECU) based on input signals fed to such ECU such as accelerator pedal position, current engine operating conditions, temperature, pressures, and others. During the subsequent gearshift event, the engine is controlled based on torque requests from a transmission control unit (TCU) coupled to the transmission. In Phase I of the gearshift event, engine torque is reduced and the clutch is opened to disengage the engine from the transmission. In Phase II, engine torque is at a minimum because the engine is decoupled from the transmission; thus, there is no driveline load on the engine. Further, during Phase II, the gears are changed from an initial gear to a final gear, eg., $1^{st}$ gear to $2^{nd}$ gear. During Phase III, the clutch is closed to re-engage the engine with the transmission and engine torque is restored.

Continuing to refer to FIG. 1, an operator demanded torque is shown in the engine torque portion of the graph. The shift shown in FIG. 1 is an upshift in which the relative ratio of the transmission output shaft speed to engine speed increases in going from the initial to final gear. Typically, but not necessarily, the operator is demanding increased engine torque in such an upshift event as shown. However, during the gearshift, the engine is disengaged from the transmission; thus, the engine is temporarily unable to provide operator demanded torque. As mentioned above, the transmission control unit becomes the torque requester from the engine via the engine control unit, i.e., TCU transmits request to ECU; ECU commands engine to provide, or attempt to provide, as the case may be, the transmission requested torque. During Phase I, the transmission requests a downward torque trajectory (i.e., a reduction in torque). Initially, the engine is able to provide the decreasing torque by retarding spark timing. However, the authority over torque provided by spark timing is insufficient to achieve the required torque reduction. Thus, shortly into Phase I, the transmission requested and actual engine torques deviate one from the other. This leads to an undesirable speed flare. The other measure undertaken during Phase I to cause a torque reduction is for the throttle valve to be closed. The control signal driving the throttle valve is based on an error signal generated from the difference between the transmission requested and actual engine torques.

In the throttle position/airflow portion of the FIG. 1, it can be seen that the throttle valve is commanded to gradually close shortly after the start of the gearshift event. The throttle valve has the effect of reducing airflow to the engine. However, unlike spark timing, which is a fast actuator in which the effect of making the change occurs in the next engine firing, the effect of reducing airflow is delayed from the throttle valve actuation. There is a slight actuator delay due to physical limitations of moving the throttle valve, i.e., there is a delay from the time that the signal is received by the throttle valve actuator and the throttle valve assumed the commanded position. A more significant delay is the manifold emptying delay that delays the change in airflow. Thus, in Phase I of FIG. 1, airflow lags throttle valve position changes. Thus, in the engine torque portion of FIG. 1, the actual decrease in engine torque lags the transmission requested torque decrease during Phase I.

Continuing with FIG. 1, the transmission requests a sudden decrease in torque when the clutch is fully open, shown as time $t_o$ in FIG. 1. It would be desirable to enter into Phase II at time $t_o$. However, the actual torque exceeds transmission requested torque by more than a tolerable margin. Thus, the time between time $t_o$ and the start of Phase II is a delay portion, waiting for the engine torque, and thus engine speed, to reduce to a tolerable difference. This tolerable difference between actual and transmission requested torque is shown as □ in FIG. 1. When the actual engine speed is close enough to transmission desired engine speed to allow gear changing to occur and the gearshift event begins Phase II, in which the gear changing occurs.

Continuing to refer to FIG. 1, when the transmission has completed the gear change of Phase II, which includes gear selection and synchronization, the transmission requests a jump in torque which the engine cannot immediately fulfill. Thus, actual torque goes from being a little higher, by □, than requested torque in Phase II, to being less than transmission requested torque in Phase III. Immediately, the throttle is commanded to adjust toward a more open position at the beginning of Phase III. However, the throttle valve is adjusted based on error in transmission requested torque and actual torque. Furthermore, there are both and actuator delay, i.e., a delay from the time that the throttle is commanded to open and when it opens, and an aerodynamic delay, i.e., a manifold filling delay in which the intake manifold takes time to attain the new requested pressure and a delay due to the air accelerating to the new airflow condition. Because the adjustment is based on the present error and the transmission requested torque is rising monotonically throughout Phase III, airflow fails to catch up causing the difference between transmission requested torque and actual torque to be different throughout Phase III. At the end of Phase III, as shown in FIG. 1, there is a torque mismatch between the actual torque and transmission requested torque. The clutch is fully closed and the torque mismatch causes engine speed to falter. A short time into the post-shift phase, actual torque catches up to operator demanded torque.

In an alternative situation, not shown in FIG. 1, the end of Phase III is delayed until actual torque achieves the level of operator demanded torque. Specifically, this means that the closing of the clutch is delayed such that clutch closing coincides with the time when actual torque first achieves operator demanded torque.

In the scenario shown in FIG. 1, the operator feels a drop in engine speed and a sluggish feel in the initial portion of the post-shift phase. In the alternate scenario, Phase III is a protracted period, also giving the operator a slow shift sensation. Both scenarios provide the driver with a sluggish shift feel.

SUMMARY OF THE INVENTION

Drawbacks of the prior art are overcome by a method for controlling output torque of an internal combustion engine during a gearshift event in an automatic shift manual transmission coupled to the engine. The torque is controlled by an electronically controlled throttle valve disposed in an engine intake. The method includes forecasting a throttle valve position capable of achieving a desired torque reduction in response to a signal indicating initiation of the gearshift event and actuating the throttle valve to assume the forecasted throttle position. The transmission is coupled to a transmission control unit, in which the desired torque reduction is the torque reduction requested by the transmission control unit at the end of the torque reduction phase of the gearshift event and from which the first signal indicating the start of the gearshift event is sent.

Instead of causing the throttle to react based on error signal between requested torque and actual torque, the present invention forecasts the throttle position desired at the end of Phase I and commands the throttle to assume such throttle position, thus overcoming the inherent delay between throttle actuation and the desired effect on airflow. In particular, the present invention overcomes a delay between the torque reduction phase and the start of the gear changing phase by providing transmission requested torque at the time that the clutch becomes fully opened. A further advantage provided by the present invention is that by matching the transmission requested torque trajectory during the torque reduction phase, an undesirable speed flare is prevented.

According to another aspect of the present invention, fast actuators, such as spark timing and a valve timing adjustment mechanism, are adjusted so that the actual torque trajectory during the torque reduction phase of the gearshift event matches the transmission requested torque trajectory. Fast actuators are those in which the effect created by their adjustment is realized in the next engine combustion event. By adjusting the throttle to its forecasted position all at once, in some cases actual torque drops faster than transmission requested torque. An advantage of the present invention is that spark timing can be used to smooth out the actual torque trajectory to obtain the transmission requested torque advance. Another advantage of using spark advance to smooth the torque trajectory is that during the initial portion of Phase I, torque reduction, spark timing is retarded to cause actual torque to match transmission requested torque. Spark timing's authority over engine torque is depleted at about the time that airflow starts to decline. Because spark timing is retarded during the early portion of Phase I, spark timing, then, can be advanced later in Phase I should the actual torque begin to drop below transmission requested torque due to the sudden closing of the throttle valve.

In a further embodiment, a method for controlling output torque of an internal combustion engine during a gearshift event in an automatic shift manual transmission coupled to the engine is disclosed in which torque is controlled by an electronically controlled throttle valve disposed in an engine intake and spark timing of spark plugs disposed in engine cylinder. The method includes forecasting a throttle valve position capable of achieving a desired torque reduction in response to a signal indicating initiation of the gearshift event, actuating the throttle valve to assume said throttle position, and retarding a spark timing of the spark plugs in response to said signal.

In yet another embodiment a method for controlling torque in an internal combustion engine during a gearshift event in an automatic shift manual transmission coupled to the engine is disclosed. The torque is controlled by fuel injectors coupled to engine cylinders and an electronically controlled throttle valve disposed in an engine intake. The method includes reducing a fuel pulse width commanded to the fuel injectors to substantially zero in response to a signal, forecasting an operator demanded engine torque at the end of the shift event, determining a new throttle position to provide the demanded engine torque, and actuating the throttle valve to assume the new position in response to said signal. If the engine is an eight-cylinder engine, the torque reduction in turning off one injector is approximately 12.5%, which provides a stair step reduction in torque. Spark advance is used to smooth out the torque trajectory.

The above advantages and other advantages, objects, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein:

FIG. 2 is a schematic diagram of an internal combustion engine equipped with an ASM transmission, according to an aspect of the present invention;

FIG. 7 is a flowchart for a normal performance upshift;

FIG. 7A is a flowchart for an alternate normal performance upshift;

FIG. 8 is a flowchart for a high performance upshift; and

FIG. 9 is a flowchart for a super performance upshift.

DESCRIPTION OF PREFERRED EMBODIMENTS

Figure 1:
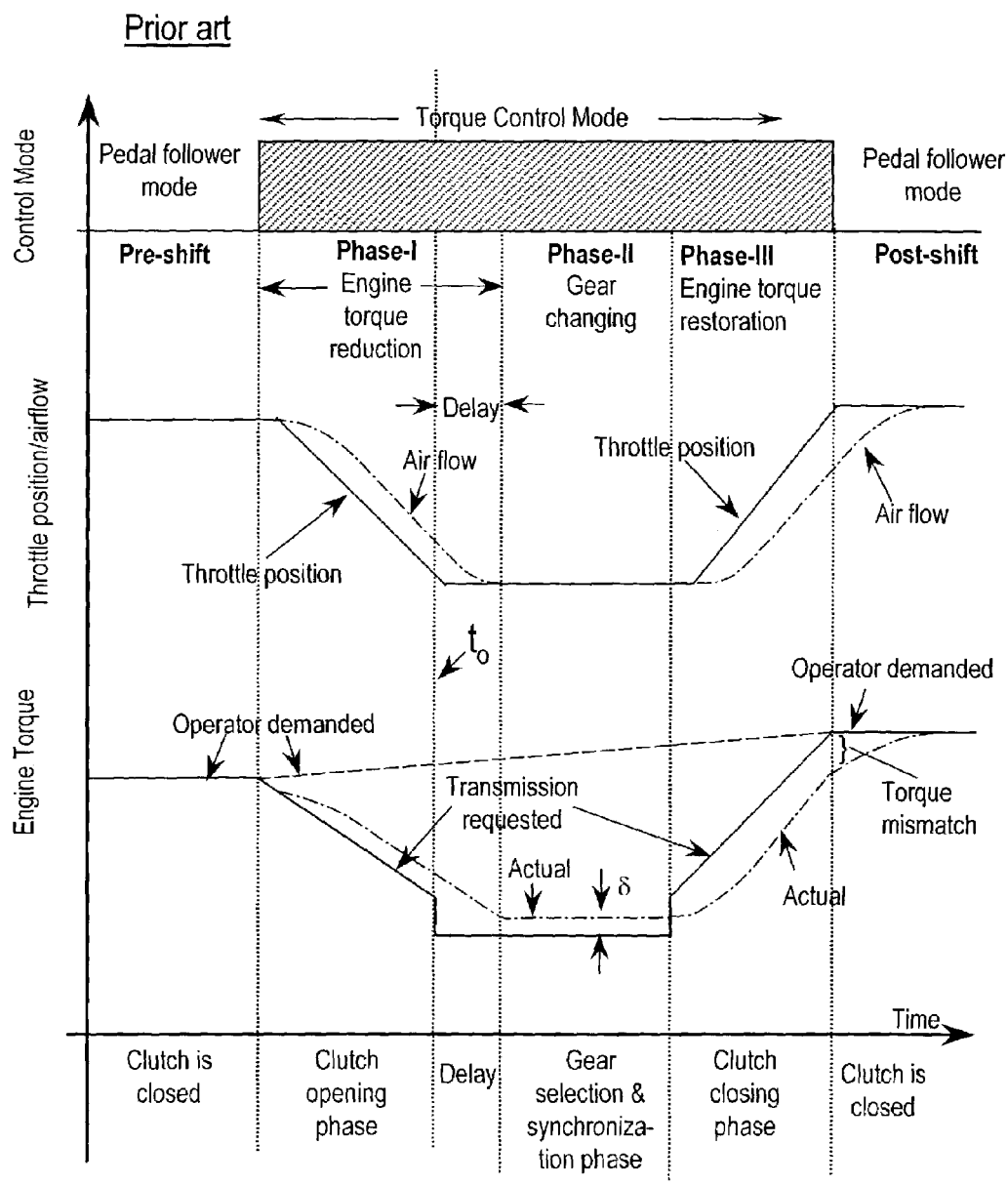
FIG. 1 is a timeline of an automatic shifting manual transmission shift according to the prior art.

Referring to FIG. 2, an engine 10 is shown coupled and an automatic shift manual (ASM) transmission 18. The ASM transmission 18 is hydraulically actuated. The hydraulic fluid reservoir 1 is connected by hydraulic lines to an electrically-actuated hydraulic pump 2 and shift actuator 3. Shift actuator 3 is connected by hydraulic lines to clutch actuator 5 (i.e., a clutch) and a pressure accumulator 4. Hydraulic pump 2 is coupled to transmission control unit (TCU) 20 via a pump relay 16. TCU 20 receives input from clutch position sensor 6, input shaft speed sensor 7, two gear position sensors 8, output shaft speed sensor 9, pressure sensor 12, driver interface 14, and crank interrupt relay 15. Transmission control unit 20 is coupled to an engine control unit (ECU) 40 by a computer area network (CAN) connection, or other protocol capable of transferring data between the two control units, e.g., hardwired or wireless. TCU 20 controls four solenoid valves 11 which direct high pressure fluid to move the shift lever rods (not shown) along the H pattern to change gears.

Figure 2A:
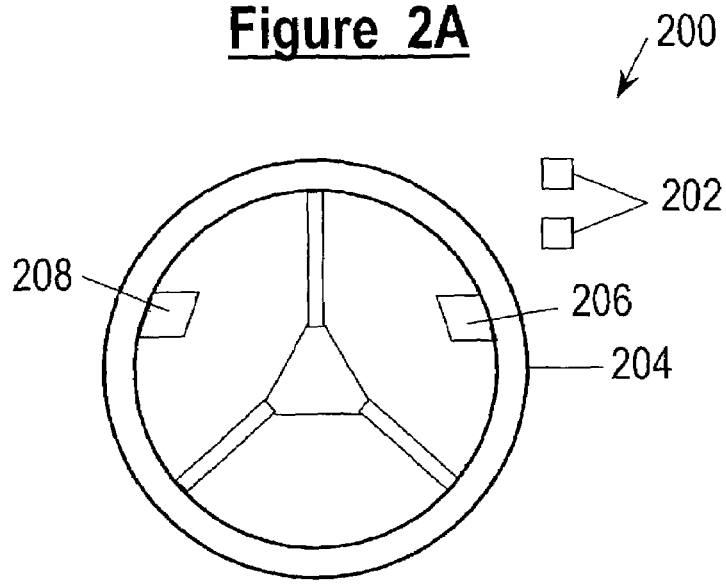
FIG. 2A is a schematic diagram of part of a vehicle dashboard showing driver interface components.

Referring now to FIG. 2A, driver interface 14 includes operator hand-operated shift paddles 206 and 208 and mode select buttons 202. Driver interface 14 is electronically coupled to TCU 20, as shown in FIG. 2. Shift paddles 206 and 208 are operated by the driver to indicate a desire for an upshift or a downshift, respectively. In one embodiment, one of mode buttons 202 is used by the operator to indicate AS-ASM or OS-ASM mode. The other mode button 202 is used to indicate a shift style desired by the operator: normal or aggressive. Alternatively, mode buttons 202 is a combination of push buttons, toggle switches, rotary switches, or any other switch.

Also, shown in FIG. 2 is an accelerator pedal 44 coupled to pedal position sensor 38. The driver of the vehicle actuates accelerator pedal 44 to indicate the driver request for torque. A signal indicative of position of accelerator pedal 44 is communicated to ECU 40 by pedal position sensor 38.

Referring now to FIG. 2A, in the OS-ASM, mode the shift paddles 206, 208 are actuated to indicate both the type of shift, i.e., up or down, and when a gear shift is desired. In a second operating mode, AS-ASM, the TCU 20 requests a shift based on operating condition and communicates that request with ECU 40. Alternatively, a request for a gearshift to an AS-ASM transmission could be provided by other modules within the vehicle.

Referring now to FIG. 2, engine 10 has a lower end 34, a cylinder head 22, and a block 32. Within the block are cylinders 30 in which pistons 28 reciprocate. Fuel injectors 24 and spark plugs 26 are disposed in cylinder head 22. This fueling configuration is known as direct fuel injection. The present invention applies to other fuel delivery methods including, but not limited to, port fuel injection, in which the injectors are disposed in the intake ports outside the cylinders, carburetion, central fuel injection, in which injectors are disposed in the intake system upstream of where the intake splits to feed the cylinders, and combinations thereof Engine 10 is supplied air through intake 47, which has throttle valve 45, which can be rotated to adjust the flow of air into engine 10.

Referring again to FIG. 2A, a portion of a dashboard 200 is shown. The steering wheel 204 is connected to a steering column (not shown), which comes through dashboard 200. Shift paddles 206 and 208 are depressed by the operator of the vehicle to indicate a desire for an upshift or a downshift, respectively. For example, depressing paddle 206 indicates a desire for an upshift from the current gear to one gear higher; depressing paddle 206 twice indicates a desire for an upshift from the current gear to two gears higher. Paddles 206 and 208 are shown in FIG. 2A attached to steering wheel 204 such that when steering wheel 204 is rotated, paddles 200 and 208 also rotate. Alternatively, the paddles 204, 206 can be attached to the steering column but adjacent to the outside rim of steering wheel 204. In this configuration, the paddles do not rotate with steering wheel 204. Regardless of configuration, paddles 206 and 208 are electronically coupled to TCU 20. Buttons 202 are on dashboard 200. By manipulating buttons 202, the operator indicates type of operating mode, OS-ASM or AS-ASM. In one embodiment, the driver can also indicate driving style desired: normal or aggressive, which refers to control of the transmission, which is not part of the present invention and not discussed further. Buttons 202 can be: toggle, rotating, push button, or other known types.

Figure 2B:
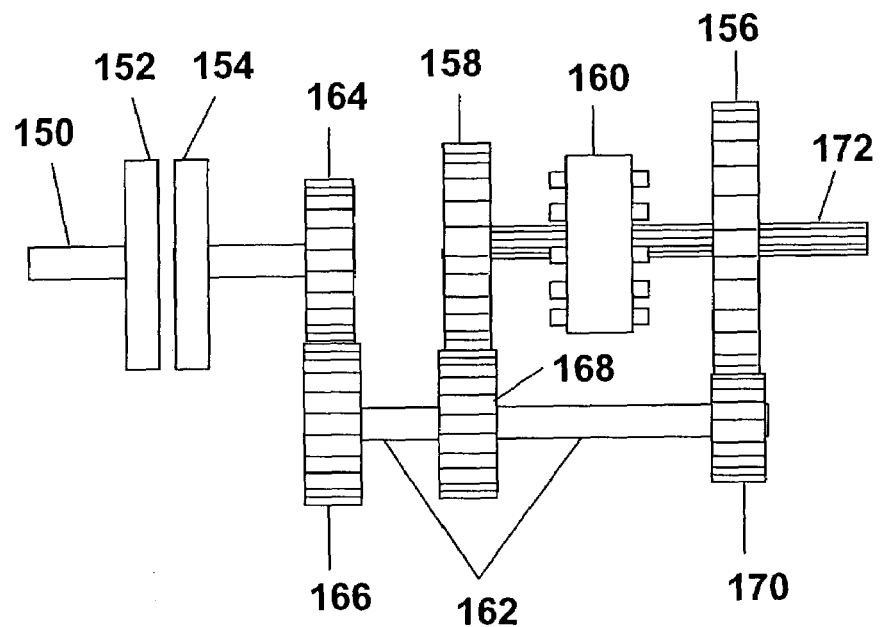
FIG. 2B is a schematic diagram of a two-speed manual transmission in which the clutch is open and the transmission is in neutral.

Referring now to FIG. 2B, a clutch, including plates 152 and 154, and a two-speed transmission is shown. Typically, manual transmissions have four to six gears. The gear set shown in FIG. 2B is merely an example and not intended to be limiting. Clutch plate 152 is fixed to shaft 150, which couples to the engine. Thus, the clutch plate 152 rotates at engine rotational speed at all times. In FIG. 2B, clutch plates 152 and 154 are apart; thus, the clutch is disengaged or open. In this situation, engine 10 is decoupled from the transmission. Clutch plate 154 is fixed to gear 164. Gear 164 meshes with gear 166, which is fixed to layshaft 162. Layshaft 162 also contains and is affixed to gears 168 and 170. Gears 168 and 170 mesh with gears 158 and 156, respectively. Shaft 172 is a spline shaft that is coupled to the driving wheels via a differential and driveshaft (not shown). Shaft 172 is not attached to gears 156 and 158. Instead, gears 156 and 158 have bearings (not shown) in between shaft 172 and each of gears 156 and 158 to allow 156 and 158 to rotate independently of shaft 172 and each other. Collar 160 is connected, through the splines, to shaft 172, thus spinning with shaft 172. The teeth on collar 160, called dog teeth, can be fit into corresponding holes on the sides of gears 156 and 158. In FIG. 2B, the collar is in a center position, decoupled from both gears 156 and 158. Thus, the transmission is in neutral. To select a gear, collar 160 is caused to move toward gear 156, a lower gear, or toward gear 158, a higher gear. Making a change from gear 156 to gear 158 is called an upshift and vice versa is a downshift. The lever, or other mechanism, by which collar 160 is caused to couple to a gear is not shown.

Figure 2C:
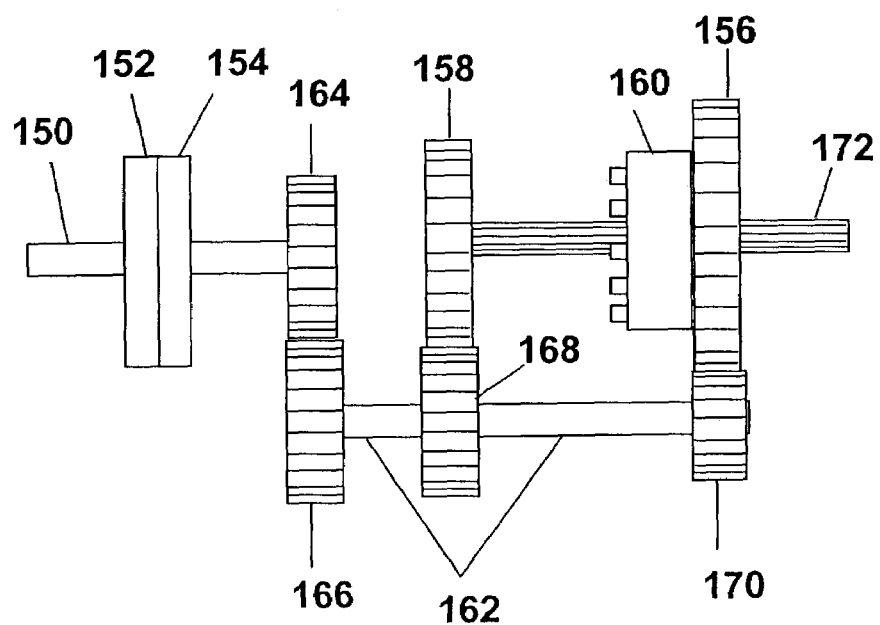
FIG. 2C is a schematic diagram of a two-speed manual transmission in which the clutch is closed and the transmission is a first gear.

Referring to FIG. 2C, clutch plates 152 and 154 are shown in proximity to each other. By a force applied to force clutch plates 152 and 154 together, the two to rotate together due to friction. The position shown in FIG. 2C is an engaged, or closed, clutch. Also shown in FIG. 2C is collar 160 with dog teeth coupled to gear 156. In the configuration of FIG. 2C, shaft 150, plates 152 and 154, and gear 164 all rotate at engine speed. Layshaft 162, gears 166, 168, and 170 rotate at engine speed times the gear ratio between gears 164 and 166. Gear 158 rotates at the rotational rate of gear 168 times the gear ratio between gears 168 and 158. However, gear 158 is not coupled to layshaft 172 and has no effect on driving speed. Similarly, gear 156 rotates at the rotational rate of gear 170 times the gear ratio between gears 170 and 156. Because collar 160 is coupled to gear 156 via the dog teeth, collar 160 and gear 156 rotate at the same speed. Collar 160, being splined to shaft 172, causes shaft 172 to rotate at this same speed, also. In this way, the rotational speed between shaft 150 and shaft 172 is based on gears 164, 166, 170, and 158. If collar 160 were, instead, coupled to gear 158, the relative rotational speed of shafts 150 and 12 is based on gears 164, 166, 168, and 158.

Referring again to FIG. 2, ECU 40 is provided to control engine 10. ECU 40 has a microprocessor 50, called a central processing unit (CPU), in communication with memory management unit (MMU) 48. MMU 48 controls the movement of data among the various computer readable storage media and communicates data to and from CPU 50. The computer readable storage media preferably include volatile and nonvolatile storage in read-only memory (ROM) 58, random-access memory (RAM) 56, and keep-alive memory (KAM) 54, for example. KAM 54 may be used to store various operating variables while CPU 50 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 50 in controlling the engine or vehicle into which the engine is mounted. The computer-readable storage media may also include floppy disks, CD-ROMs, hard disks, and the like. CPU 50 communicates with various sensors and actuators via an input/output (I/O) interface 52. Example items actuated under control of CPU 50, through I/O interface 52, are fuel injection timing, fuel injection rate, fuel injection duration, throttle valve position, spark plug timing, exhaust gas recirculation valve position, and others. Driver display 36, which displays engine rpm, current gear and others to the operator, receives data via I/O interface 52. Sensors 42 communicating input through I/O interface 52 preferably include sensors indicating piston position, engine rotational speed, vehicle speed, coolant temperature, barometric pressure, exhaust gas recirculation valve position, intake manifold pressure, accelerator pedal position 38, throttle valve position, air temperature, exhaust temperature, exhaust stoichiometry, exhaust component concentration, air flow, and others. Some ECU 40 architectures do not contain MMU 48. If no MMU 48 is employed, CPU 50 manages data and connects directly to ROM 58, RAM 56, and KAM 54. Of course, the present invention could utilize more than one CPU 50 to provide engine control and ECU 40 may contain multiple ROM 58, RAM 56, and KAM 54 coupled to MMU 48 or CPU 50 depending upon the particular application. In FIG. 2, ECU 40 and TCU 20 are separate units. However, the functionality of the two could be combined in a single control unit without departing from the spirit of the present invention.

Figure 3:
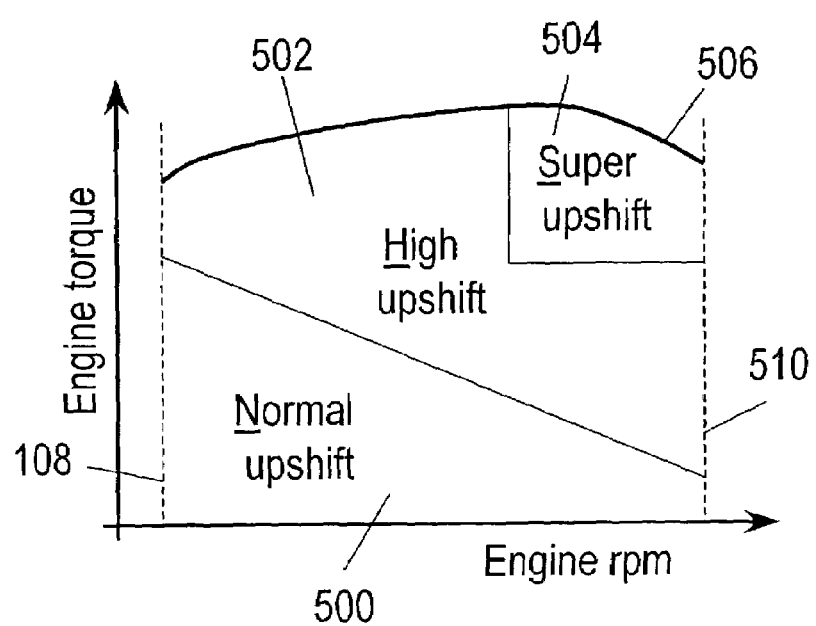
FIG. 3 is an engine operating map indicating regions under which various upshifts are performed, according to an aspect of the present invention.
Figure 4:
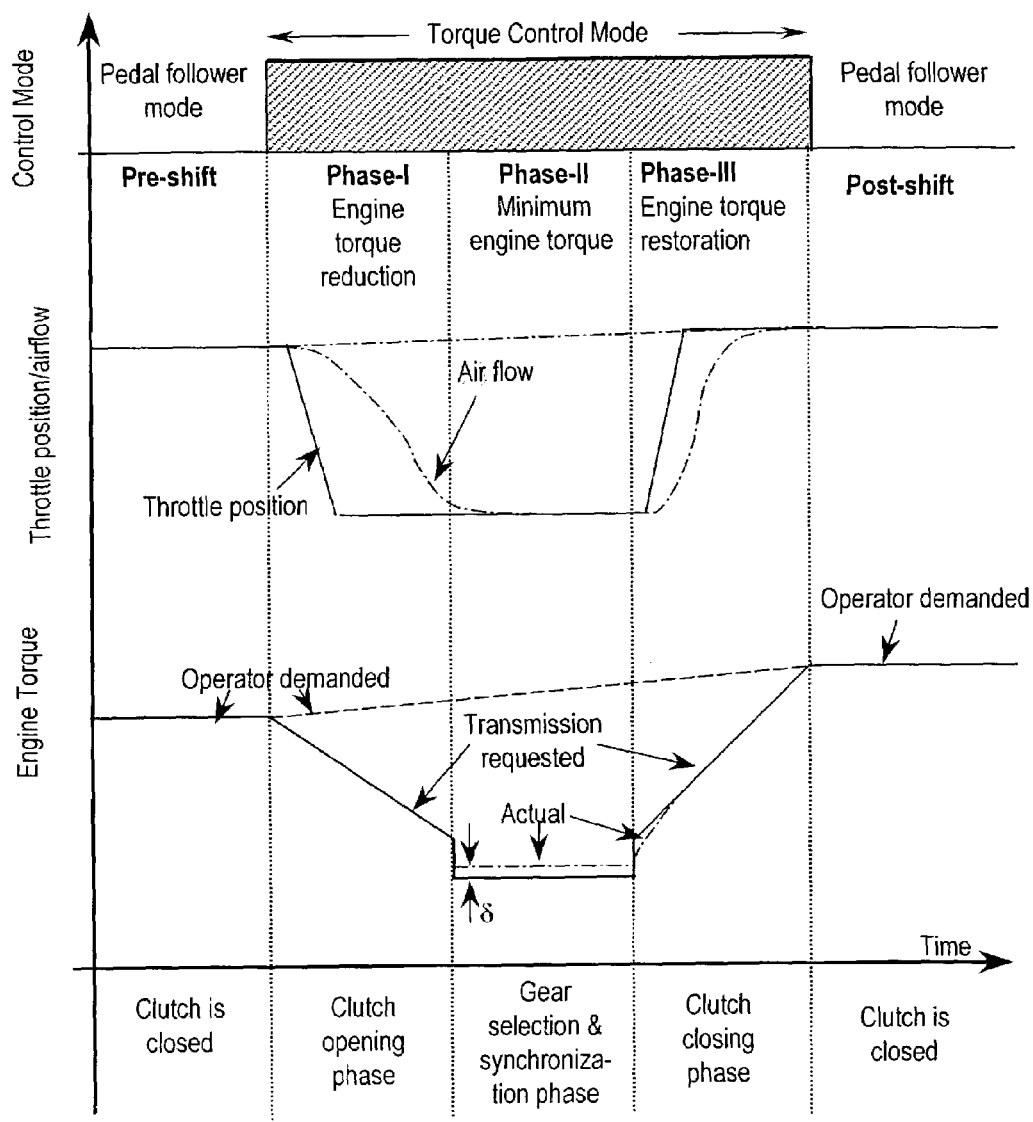
FIG. 4 is a graph showing upshift phases for a normal (N) performance shift, according to the present invention.

In FIG. 3, an engine operating map is shown. Curve 506 indicates the maximum torque available from the engine as a function of engine speed. Dotted lines 508 and 510 show the minimum and maximum engine operating speeds, respectively. Areas 500, 502, and 504 shows areas where the engine is controlled according to normal (N) performance shift high (H) performance shift, and super (S) performance shift strategies. Details of the strategies are provided below. The shape of the map shown in FIG. 3 is included to provide an example and is not intended to be limiting. The TCU is the torque requester during the shift. Therefore, depending on the speed-load condition of the engine, the TCU requests an appropriate torque from the ECU. Referring now to FIG. 4, a timeline of a transmission upshift according to an aspect of the present invention is shown for a normal performance shift. At the top of FIG. 4 is the control mode. Pre-shift and post-shift are pedal follower engine control, where engine control is performed independently of the transmission. Pedal follower is one example of a control type. Alternatively, other control strategies could be employed pre- and post-shift. During the shift event, the engine control unit attempts to provide the transmission requested torque value. In the engine torque portion of FIG. 4, operator demanded torque is shown. Operator demanded torque is honored, temporarily, during the shift event. Phase I of the shift event is a torque reduction phase during which the clutch is opened or disengaged. When the clutch is disengaged, the engine and transmission are decoupled. At the beginning of Phase I, the clutch is fully engaged and by the end of Phase I, the clutch is fully disengaged. The transmission control unit requests a monotonically decreasing torque trajectory during Phase I. In a normal shift, according to the present invention, a throttle position which will provide the desired torque during Phase II of the shift is forecasted and commanded to the throttle. As discussed above regarding FIG. 1, prior art, there is an inherent delay between throttle actuation and the desired effect on the airflow. To overcome the inherent delay, the throttle is caused to assume the new position immediately after the start of the gearshift event. The TCU provides a signal to the ECU indicating the beginning of the gearshift event. The TCU also provides the ECU with information about the desired torque trajectory during Phase I and the desired torque during Phase II. In the throttle/airflow portion of FIG. 4, the throttle valve shows a slight delay before changing position. This delay is due to a physical delay in accelerating the throttle plate and any signal delay. The throttle valve then moves quickly to its forecasted new position. The effect of the new throttle valve position on airflow is delayed. During the initial portion of torque reduction phase, the actual torque is able to follow engine demanded torque by retarding spark timing commanded to the spark plugs. As mentioned above, spark has a limited range of authority over engine torque. When spark authority runs out, the airflow has begun to drop, thereby allowing actual torque to follow demanded torque during the decline. Since the throttle valve is slammed to the new position rapidly, in some cases, the airflow drops more rapidly than necessary to follow the torque trajectory during Phase I. Spark timing, a fast engine actuator, is used to make up the difference between discrepancies between actual and desired torque due to airflow.

Continuing to refer to FIG. 4, when the clutch is fully disengaged, at the end of Phase I, actual and transmission requested torques are matched thereby facilitating initiation of the gear changing phase including gear selection and synchronization. The TCU sends a signal indicating the beginning of Phase II. The TCU requests an immediate drop in engine torque at the beginning of Phase II. Most of the drop in torque is provided by retarding spark advance. Because fuel continues to be delivered to all engine cylinders, typically, the actual torque exceeds the transmission requested torque, but by a tolerable predetermined fraction, $\delta$. A typical value of $\delta$ is 5%. Continuing to refer to FIG. 4, when the gear change including the synchronization is complete, the transmission provides a signal indicating that the torque restoration phase, Phase III, is beginning. During Phase III, the clutch is being engaged or closed. At the beginning of Phase III, the clutch is completely open, i.e., decoupled from the engine and at the end of Phase III, the clutch is completely closed, i.e., coupled to the engine, meaning that the output shaft of the engine and the input shaft of the transmission rotate at the same speed. The transmission requests an immediate rise in torque. A portion of that rise in torque is provided by advancing spark timing. However, the actual torque is below that of the transmission requested torque. Based on the operator demanded torque predicted at the end of the gearshift event, a new throttle position to provide that torque is forecasted and immediately commanded. Early in Phase III, the throttle does not move. Then, it quickly attains the new position. The air flow lags the throttle valve changes. Thus, the actual torque trajectory, for the initial portion of Phase III, lags the transmission requested torque. However, actual torque recovers early on and attains transmission requested torque throughout the remainder of Phase III. As in Phase I, by actuating the throttle valve to the new position immediately, in some cases, would cause actual torque to overshoot transmission requested torque. Spark timing is used to smooth out differences between the two torques. As shown in FIG. 4, the delay between throttle valve actuation and airflow is greater during Phase I than it is during Phase III. It takes longer to empty the engine intake of air, particularly in the situation approaching very low torque, than it does to fill the manifold.

Figure 4A:
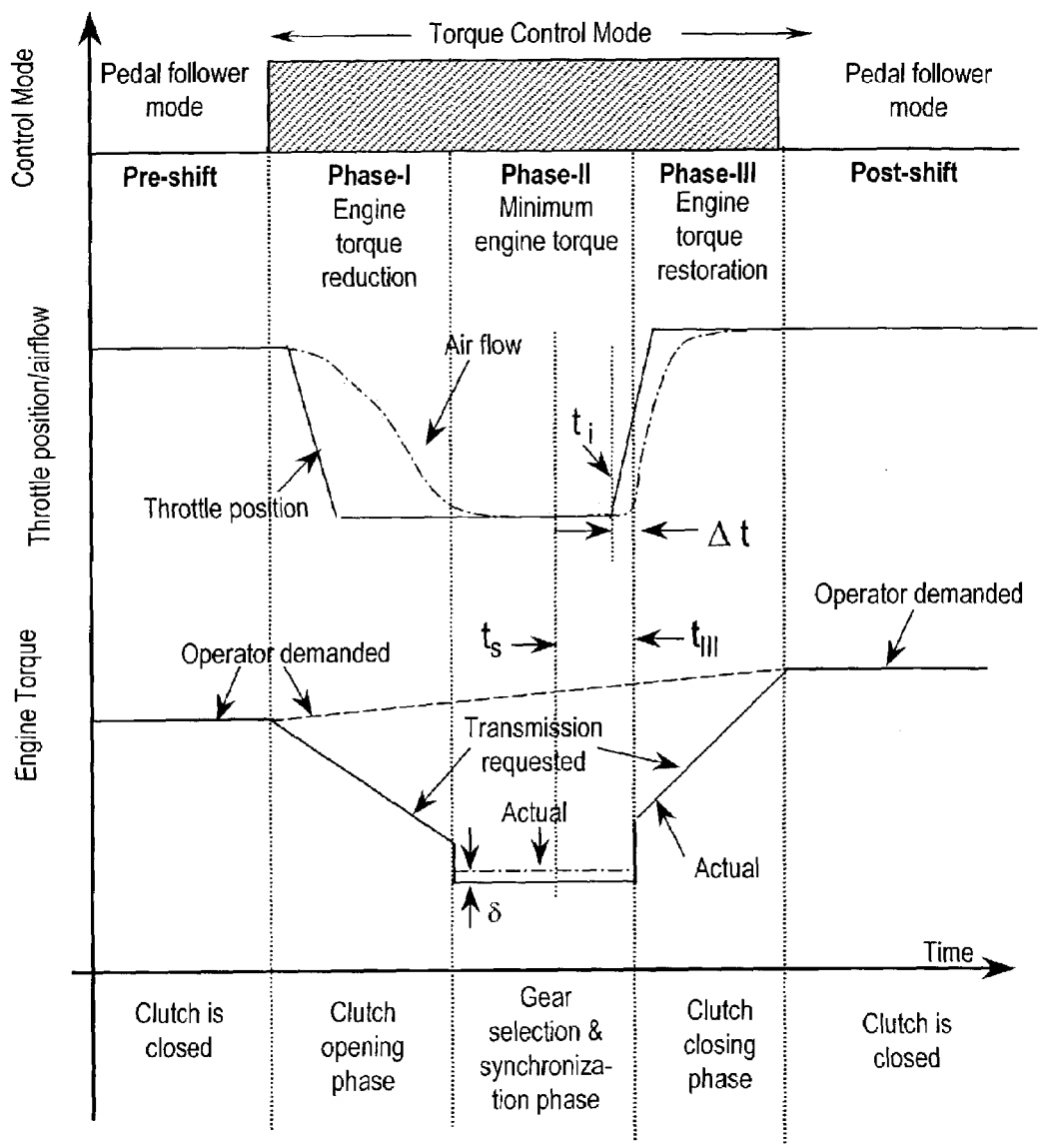
FIG. 4A is a graph showing upshift phases for an alternate normal (N) performance shift, according to the present invention.

Referring now to FIG. 4A, an alternate normal shift according to an aspect of the present invention is shown. The shift timelines of FIGS. 4 and 4A are identical prior to the middle of Phase II. The inventors of the present invention have recognized that the lag in actual torque compared to transmission requested torque in Phase III of FIG. 4, can be overcome by actuating the throttle valve to assume its new position prior to initiation of Phase III. Phase II of the gearshift event is somewhat variable. The inventors of the present invention have found that if the end of Phase III, $t_{III}$, is predicted during Phase II and that information is used to actuate the throttle valve to assume a new position, that the variation in Phase II timing causes the actuation of the throttle valve to vary too much, i.e., is not accurate enough in time. However, according to the method illustrated in FIG. 4A, the TCU provides an additional signal sometime during Phase II, in particular, when the end of Phase II can be reliably predicted. At time $t_s$, when the signal comes in, the TCU also communicates a datum, $t_{III}$, i.e., the predicted time at which Phase III can begin, to the ECU. The ECU determines a time, $\Delta t$, at which the throttle valve may be actuated prior to the end of Phase II without incurring a torque increase. The computation of $\Delta t$ is based on computer models of the delays in the system or determined from a lookup table. By knowing the present time, $t_s$, the time at which phase II is terminated, $t_{III}$, and $\Delta t$, a time to initiate the throttle valve, $t_i$, is computed. Thus, in FIG. 4A, the throttle valve is actuated prior to the end of Phase II. But, because the time of initiation is carefully chosen, airflow does not begin to rise until just at the time of the beginning of Phase III. Consequently, the actual engine torque matches the transmission requested torque, at the beginning of phase III, in particular.

A normal shift according to the events shown in FIG. 4 occurs in roughly 750 msec and slightly less for the invention as shown in FIG. 4A. This compares with roughly 1000 msec according to the prior art (FIG. 1).

Figure 5:
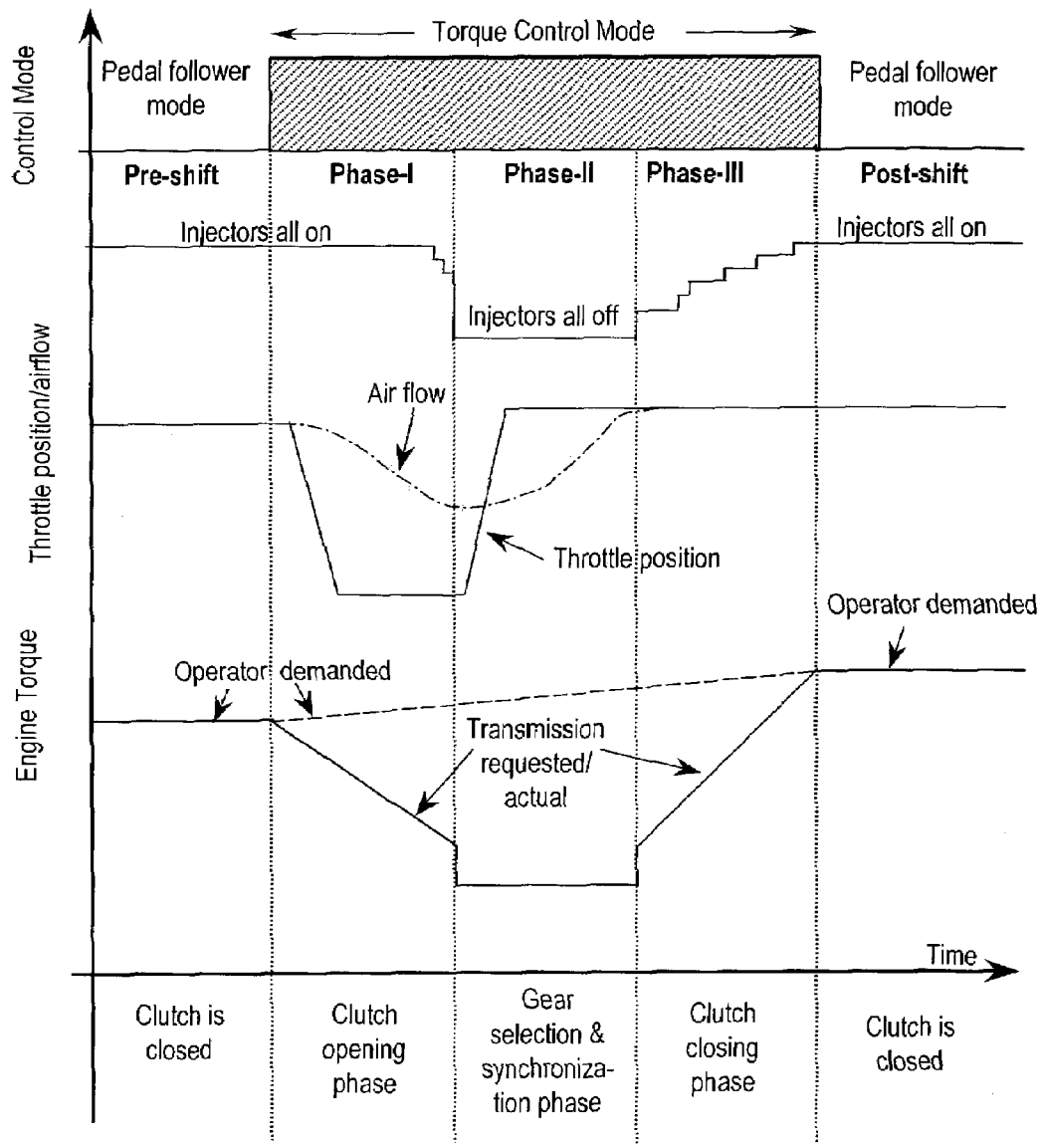
FIG. 5 is a graph showing upshift phases for a high (H) performance shift, according to the present invention.

Referring now to FIG. 5, a timeline of a high performance transmission shift is shown. The high performance gearshift event occurs in roughly 400 msec, which is about half the time of the normal shift. The timeline of the shift event in FIG. 5 has not been contracted by half for the sake of clarity in understanding the phases of the gearshift event. The gear changing phase is roughly the same duration for all shift types, taking up about 100 msec. The remainder of the time in the gearshift event is roughly divided evenly between the torque reduction and torque restoration phases. During Phase I of the high performance gearshift event, two things occur as soon as a signal is received that the gearshift has been initiated: the spark timing is retarded and the throttle valve is commanded to a new position, the new position being a forecast of the position that will provide the desired torque during Phase II. The airflow delay is even more pronounced in FIG. 5 than in FIG. 4 because there is less time in Phase I in the high performance shift than the normal performance shift. In reality, the airflow does not achieve the desired airflow during Phase I or in Phase II. In most cases, the spark retardation and the throttle valve actuation are insufficient to bring the torque close enough to the transmission requested, or desired, torque. To reduce torque further, one or both of the following measures can be undertaken: reduce fuel pulse width to the injectors and reduce fuel pulse width to zero in a portion of fuel injectors. The latter measure can be undertaken in one or more injectors initially. Depending on whether the torque reduces to the desired value, the fuel pulse width is reduced to zero in more injectors. The torque decline by turning off injectors, in the absence of other measures, would be a jagged stair step type of descent. Spark advance is adjusted to smooth out the torque trajectory so that actual torque closely matches transmission requested torque. Regarding enleanment, i.e., fuel pulse width being reduced, the amount of enleanment or fuel pulse width reduction is limited such that the mixture in the cylinder is rich enough to burn, i.e., the fuel-air ratio in the cylinder is greater than the lean flammability limit.

Continuing to refer to FIG. 5, at the start of Phase II, the TCU requests an immediate drop in torque, thus, the fuel pulse width (FPW) to all injectors is commanded to zero. Consequently, the transmission requested torque and the actual torque match during Phase II. Because the injectors are deactivated during Phase II, it is possible to adjust the position of the throttle valve without affecting engine torque.

Thus, at the beginning of Phase II, a new position for the throttle valve is forecasted which would provide the desired torque at the end of the gearshift event and the throttle valve is commanded to the new position. The airflow lags the throttle valve movement. However, air flow achieves the higher airflow nearly by the time of the start of Phase III.

Continuing to refer to FIG. 5, at the beginning of Phase III, the TCU requests an immediate increase in actual torque which is provided by commanding a positive FPW to a portion of engine cylinders. Engine cylinders are turned on successively through Phase III to roughly provide the torque trajectory that is requested by the TCU during Phase III. A stair step increase in torque would result if no other; measure were taken; the term roughly provide indicates the stepwise increases in torque by the measure of turning on injectors. To smooth the torque trajectory to closely match that desired, spark advance is adjusted throughout Phase III.

Figure 6:
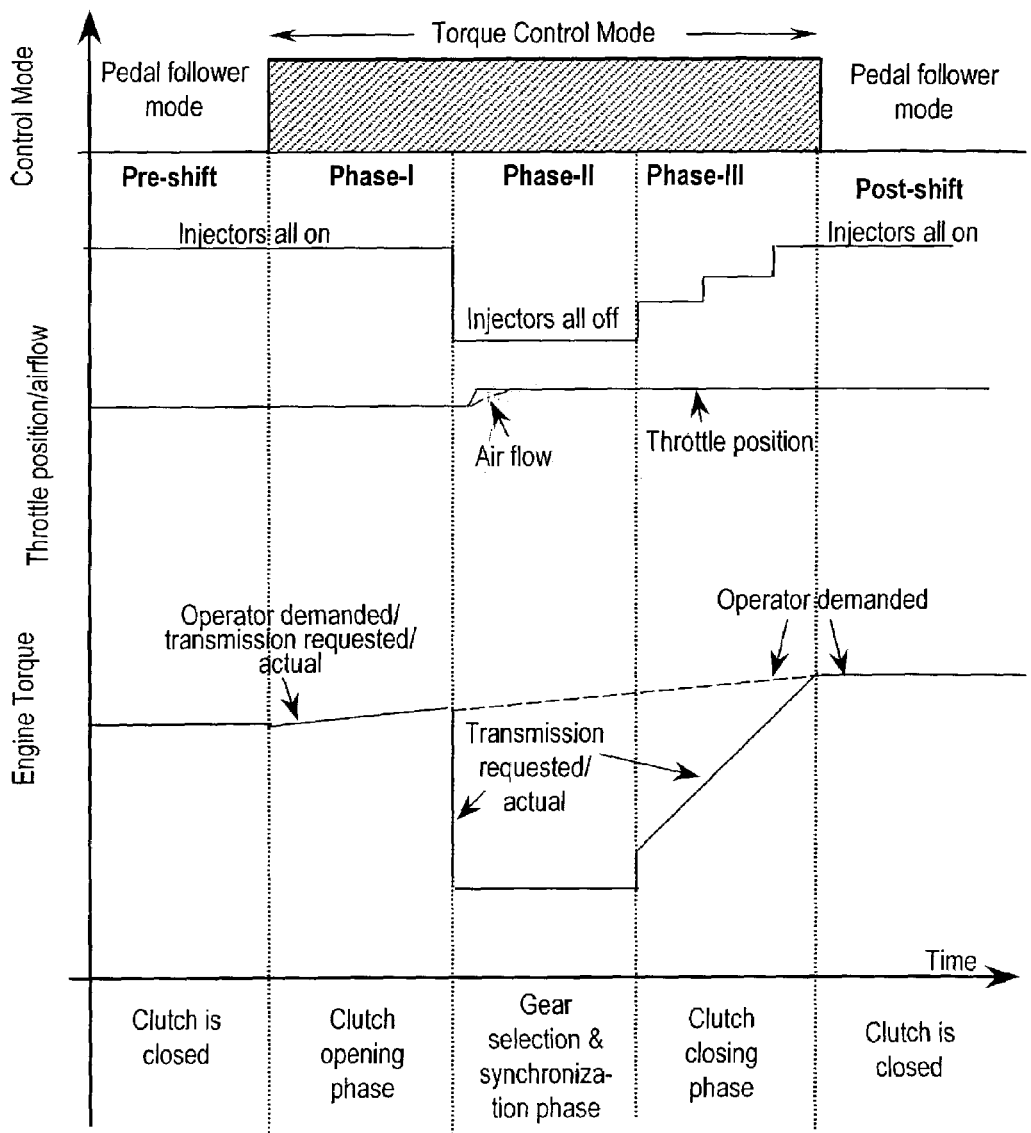
FIG. 6 is a graph showing upshift phases for a super (S) performance shift, according to the present invention.

Referring now to FIG. 6, a timeline of a super performance shift is shown. The transmission does not request a torque reduction in the super performance shift. Thus, no torque reducing measures are taken. Because the clutch is being disengaged during Phase I, load is being taken off the engine. Consequently, the engine speed rises sharply during Phase I. When the signal is received that Phase II is initiated, FPW to all the injectors is zero so that the transmission requested torque is provided by the engine. At the beginning of Phase II, the throttle valve is adjusted to a new position, which is the forecasted position to provide operator desired torque at the end of the shift event. For the example shown in FIG. 6, the operator is requesting a slight increase in torque during the gearshift event. Thus, to prepare for the higher torque demanded at the end of the shift event, the throttle is caused to assume the new position. As shown in FIG. 6, the airflow lags slightly. However, because the injectors are not providing any fuel during the throttle valve adjustment, the lag in airflow is immaterial. At the beginning of Phase III, a portion of fuel injectors are reactivated, i.e., commanded to give a positive FPW. Throughout Phase III, more injectors are reactivated to provide the desired torque trajectory. As discussed above, spark advance is used to smooth the torque trajectory, which would be a jagged rise if no smoothing method were used. The super performance shift occurs in roughly 200 msec, i.e., about half the time of the high performance shift.

Referring now to FIG. 7, a flowchart showing the strategy employed in a normal shift (corresponding to timeline in FIG. 4 ) is shown. Starting in block 60, the TCU requests a gearshift based on operating conditions. This occurs in an AS-ASM operation mode. Alternatively, the gearshift can be initiated by an operator request in block 62, which is transmitted to TCU 20. In either case, control passes to block 64 in which TCU 20 communicates the request to ECU 40, thereby signaling the beginning of Phase I. The torque control changes from pedal follower in step 68. In step 70, the desired torque reduction is computed. This desired torque reduction is based on the transmission requested torque during Phase II. In step 72, the throttle valve position to achieve the torque reduction is forecast and the throttle is position accordingly in step 74. Steps 70, 72, and 74 occur immediately after the beginning of Phase I. Also corresponding to Phase I is step 76 in which fast actuators are adjusted to cause the actual torque trajectory to closely match the transmission requested torque trajectory during Phase I. A signal is received from the TCU indicating the beginning of Phase II, and control continues to step 78 in which the spark is retarded, to give the desire torque drop. At the beginning of Phase III (also indicated by a signal from the TCU), a torque increase is requested and the spark timing is advanced in step 80. In step 82, the desired torque increase is computed. This is based on operator demanded torque projected at the termination of the gearshift event. In step 84, the throttle valve position to provide the torque increase is determined. And, in step 86, the throttle valve is positioned accordingly. In step 88, fast actuators, most notably spark timing, is adjusted to provide the transmission requested torque trajectory during Phase III. Torque control is returned to pedal follower in step 90.

Referring now to FIG. 7A, a flowchart showing the strategy employed in an alternate normal shift (corresponding to timeline in FIG. 4A) is shown. Steps 60, 62, 64, 68, 70, 72, 74, 76, and 78 are identical to those in FIG. 7. In step 79, an additional piece of information is sent by TCU, the information being the predicted Phase III initiation time. Steps 82 and 84 are identical to that shown in FIG. 7 and not described again here. In step 85, the time to initiate the throttle is determined based on the Phase II termination time, and a model of the expected delay between throttle actuation and airflow change. In step 87, the throttle is actuated to assume the forecasted position at the initiation time computed in step 85. Control passes to step 80 in which the spark is advanced at the beginning of Phase III. Control passes to steps 88 and 90, which are described above in conjunction with FIG. 7.

Referring now to FIG. 8, a flowchart showing the strategy employed in a high performance shift is shown. Steps 60, 62, 64, 68, 70, 72, and 74 are described above in regards to FIG. 7. In step 100, the spark timing is retarded at the beginning of Phase I. Steps 70, 72, and 74 occur simultaneously with, shortly before, or shortly after step 100. In step 102, it is determined whether the spark retard and throttle adjusting measures were sufficient to diminish torque in step 102. In particular, it is determined if actual engine torque is within 5% of the transmission requested torque. If so, control passes to step 110. If not, control passes to step 104 in which FPW to the injectors is reduced, causing engine cylinders to produce less torque. The FPW reduction is such that the fuel-air ratio in the cylinder is maintained above the lean flammability fuel-air ratio. Control passes to step 106, which performs the same test as in step 102. If a positive result, control passes to step 110. If a negative result, FPW in a least one cylinder is reduced to zero. Control passes back to step 106. Step 108 is repeated until a positive result in step 106 breaks out of the loop.

Referring now to FIG. 8A, a continuation of the flowchart from FIG. 8, in step 110, a zero FPW is commanded to all injectors at the start of Phase II. In step 112, the desired torque increase to be achieved at the end of the gearshift event is computed. The forecasted throttle valve position to provide the desired increase is computed in step 114 and the throttle is adjusted to the forecasted position in step 116. In step 118, a positive FPW is commanded to a portion of fuel injectors at the start of Phase III. In step 120, the rest of the injectors are activated, in succession, throughout Phase III. Occurring simultaneously with steps 118 and 120, fast actuators are adjusted to provide the desired Phase III torque trajectory. Control passes to step 90, which is discussed above.

Referring now to FIG. 9, a flowchart showing the strategy employed in a super performance shift is shown. Steps 60, 62, 64, and 68 are described above. In step 130, throttle valve is held constant during Phase I. At the initiation of Phase II, a zero FPW is commanded to all the fuel injectors in step 132. In step 134, throttle valve position which will provide the desire (operator demanded torque) at the end of the gearshift event is forecasted. The throttle valve is adjusted to the new position in step 136. At the initiation of Phase III, a positive FPW is commanded to a portion of fuel injectors in step 138. The rest of the injectors are activated, in groups of one or more cylinders, in step 140. Concurrent with step 138 and 140, step 142 is undertaken to smooth out the torque trajectory. In particular, fast actuators, e.g., spark timing is used to closely match actual torque to transmission requested torque.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for controlling output torque of an internal combustion engine during a torque reduction phase of a gearshift event such torque being controlled by an electronically controlled throttle valve disposed in an engine intake, such method comprising:
   forecasting a throttle valve position to achieve a desired torque reduction in response to a signal indicating initiation of the gearshift event;
   actuating the throttle valve to position the throttle valve to said forecasted throttle valve position;
   determining a transmission requested torque trajectory with a transmission control unit coupled to said transmission; and
   adjusting fast actuators coupled to the engine to have the output torque match a torque trajectory during the torque reduction phase such that the torque trajectory and the requested torque trajectory are substantially the same during most of the torque reduction phase of the gearshift event wherein a fast actuator is an actuator in which the effect of an adjustment in said actuator is realized in a next engine combustion event.

2. The method of claim 1 wherein said desired torque reduction is based on a desired torque during a gear changing phase of the gearshift event.

3. The method of claim 1 wherein said torque reduction phase of the gearshift event occurs between said first-mentioned signal and a second signal, said second signal being transmitted from said transmission control unit at initiation of a gear changing phase of the gearshift event.

4. The method of claim 1 wherein said fast actuator is a spark timing of spark plugs disposed in engine cylinders.

5. The method of claim 1 wherein said desired torque reduction is determined in said transmission control unit.

6. The method of claim 5 wherein said transmission control unit transmits said signal.

7. The method of claim 1, further comprising:
   receiving an indication of a termination time of a gear selection phase of the gearshift event;
   forecasting a second throttle valve position to achieve a desired torque increase prior to said received indication; and
   estimating a delay time between actuation of the throttle valve and when airflow to engine cylinders increases.

8. The method of claim 7, further comprising: actuating the throttle valve to attain said second throttle valve position based on said termination time and said delay time.

9. The method of claim 7 wherein said desired torque increase is determined in said transmission control unit and is based on a position sensor signal of an accelerator pedal, said position sensor being electronically coupled to said transmission control unit.

10. The method of claim 7 wherein said actuation time is determined based on said termination time minus said delay time.

11. The method of claim 7 wherein said delay time is based on models of delay between throttle actuation and a change in airflow into engine cylinders.

12. The method of claim 7 wherein said delay time is determined from a lookup table of delay between throttle actuation and a change in airflow into engine cylinders.

13. A method for controlling output torque of an internal combustion engine during a gearshift event such torque being controlled by an electronically controlled throttle valve disposed in an engine intake, such method comprising:
   forecasting a throttle valve position to achieve a desired torque reduction;
   actuating the throttle valve to position the throttle valve to said forecasted throttle valve position in response to a signal indicating initiation of a torque reduction phase of the gearshift event;
   determining a desired torque in a transmission control unit coupled to said transmission; and
   retarding spark timing of spark plugs disposed in engine cylinders during a first part of the torque reduction phase and advancing spark timing during a second part of the torque reduction phase to reduce to substantially zero, a difference between the desired torque and the output torque during most of the torque reduction phase.

14. the method of claim 13, further comprising: advancing spark timing of said spark plugs in response to a third signal indicating initiation of a torque restoration phase of the gear shift event.

15. The method of claim 14, further comprising:
   determining a second throttle valve position to achieve a desired torque increase in response to said third signal; and
   adjusting the throttle valve to said second throttle position.

16. The method of claim 15, further comprising: adjusting the spark timing to cause the output torque to follow a torque trajectory during a first phase of the gearshift event wherein said torque trajectory is a desired torque trajectory determined in a transmission control unit coupled to said transmission and said first phase of the gearshift event is a time in between said first signal and a second signal indicating initiation of a gear selection phase.

17. The method of claim 15 wherein said desired torque increase is based on an operator demanded torque roughly coincident with the termination of the gearshift event.

18. The method of claim 17 wherein said operator demanded torque is based on a position of an accelerator pedal, said accelerator pedal and the engine being disposed in an automotive vehicle and being coupled to an engine control unit.

19. A method for controlling output torque of an internal combustion engine during a torque restoration phase of a gearshift event, such output torque being controlled by an electronically controlled throttle valve disposed in an engine intake, such method comprising:
   forecasting a throttle position desired at the end of said torque restoration phase of the gearshift event, said forecasting occurring prior to initiation of said torque restoration phase;

adjusting the throttle valve to said forecasted throttle position in response to a signal indicating initiation of said torque restoration phase of the gearshift event wherein said gearshift occurs in an automatic shift manual transmission coupled to the engine;

determining a desired torque increase in a transmission control unit coupled to said transmission wherein said throttle valve adjustment adjusts the output torque; and employing fast actuators to reduce to substantially zero a difference between the desired torque and the output torque before the end of the torque restoration phase.

20. The method of claim 19 wherein said signal corresponds to the termination of a gear changing phase of the gearshift event.

21. The method of claim 19 wherein said desired torque is based on an operator demanded torque at the end of the gearshift event.

22. The method of claim 21 wherein said operator demanded torque being based on a position of an accelerator pedal, said accelerator pedal and the engine being disposed in an automotive vehicle and electronically coupled to an engine control unit.

23. A method for controlling output torque of an internal combustion engine during a gearshift event, such torque being controlled by an electronically controlled throttle valve disposed in an engine intake and spark timing of spark plugs disposed in engine cylinders, such method comprising;

forecasting a throttle valve position capable of achieving a desired torque reduction during a torque reduction phase of the gearshift event in response to initiation of the gearshift event in an automatic shift manual transmission coupled to the engine;

actuating the throttle valve to assume said throttle position;

determining a desired torque in a transmission control unit coupled to said transmission; and retarding spark timing of spark plugs during a first part of the torque reduction phase and advancing spark timing during a second part of the torque reduction phase to reduce to substantially zero, a difference between the desired torque and the output torque during most of the torque reduction phase in response to a signal indicating initiation of the gearshift event.

24. The method of claim 23 wherein the engine has fuel injectors coupled to the engine cylinders, further comprising:

determining a torque difference between actual engine generated torque that result in response to said throttle valve actuation and said spark retardation and said desired torque; and reducing a fuel pulse width commanded to a portion of said fuel injectors to substantially zero when said torque difference exceeds a predetermined fraction.

25. The method of claim 23 wherein the engine has fuel injectors coupled to said engine cylinders, further comprising:

determining a torque difference between actual engine generated torque that results in response to said throttle valve actuation and said spark retardation and said desired torque; and reducing a fuel pulse width commanded to said fuel injectors when said torque difference exceeds a predetermined fraction.

26. The method of claim 25 wherein said desired torque is a requested torque determined by a transmission control unit coupled to said transmission.

27. The method of claim 25 wherein said fuel pulse width reduction is limited such that a fuel-air ratio in said engine cylinders is greater than lean flammability limit fuel-air ratio.

28. The method of claim 23 wherein the engine has fuel injectors coupled to the engine cylinders, further comprising: commanding a substantially zero fuel pulse width to all of said fuel injectors in response to a second signal indicating initiation of a gear changing phase at the gearshift event.

29. The method of claim 28, further comprising:

forecasting a second throttle valve position capable of achieving a desired torque increase during a torque restoration phase of the gearshift event, said forecasting occurring prior to initiation of said torque restoration phase; and actuating the throttle valve to assume said second throttle position.

30. The method of claim 29 wherein said desired torque increase is determined based on a desired torque at a termination time of the gearshift event.

31. The method of claim 28, further comprising: commanding a positive fuel pulse width to a first portion of fuel injectors in response to a third signal wherein said first portion is determined to roughly provide a desired torque trajectory during a first portion of a torque restoration phase of the gearshift event and said third signal indicates initiation of said torque restoration phase of the gearshift event.

32. The method of claim 31 wherein said torque restoration phase occurs between said third signal and a termination of the gearshift event.

33. The method of claim 31, further comprising: commanding a positive fuel pulse width to another portion of fuel injectors wherein said another portion is determined to roughly provide said desired torque trajectory during a succeeding portion of said torque restoration phase of the gearshift event.

34. The method of claim 33 further comprising: adjusting spark timing of said spark plugs to cause an actual engine torque to substantially match said desired torque trajectory during said torque restoration phase of the gearshift event.

35. A computer readable storage medium having stored data representing instructions executable by a computer to control output torque of an internal combustion engine during a torque reduction phase of a gearshift event, such torque being controlled by an electronically controlled throttle valve disposed in an engine intake, such storage media comprising:

instructions to maintain engine torque substantially constant just prior to the gearshift event;

instructions to forecast a throttle valve position capable of achieving a desired torque reduction in response to a signal indicating initiation of the gearshift event, said desired torque reduction being based on a desired torque during a gear changing phase of the gearshift event, said gearshift event occurring in an automatic shift manual transmission coupled to the engine;

instructions to determine a desired torque in a transmission control unit coupled to said transmission;

instructions to actuate the throttle valve to assume said throttle position; and instructions to retard a spark timing of spark plugs disposed in engine cylinders in response to said signal during a first part of the torque reduction phase and to advance spark timing during a second part of the torque reduction phase to reduce to substantially zero, a difference between the desired torque and the output torque during most of the torque reduction phase.

36. The storage media of claim 35 wherein the engine has fuel injectors coupled to said engine cylinders, further comprising:

instructions to determine a torque difference between actual engine generated torque that results in response to said throttle valve actuation and said desired torque; and instructions to reduce a fuel pulse width commanded to said fuel injectors when said torque difference exceeds a predetermined fraction.

37. A computer readable storage medium having stored data representing instructions executable by a computer to control output torque of an internal combustion engine during a torque restoration phase of a gearshift event, such torque being controlled by an electronically controlled throttle valve disposed in an engine intake, such storage media comprising:

instructions to determine a throttle valve position to achieve a desired torque increase in response to a signal indicating initiation of the torque restoration phase of the gearshift event, such gearshift event occurring in an automatic shift manual transmission coupled to the engine;

instructions to adjust the throttle valve to said throttle position; and instructions to control fast actuators to reduce a difference between a desired torque and the output torque to substantially zero before the end of the torque restoration phase.

* * * * *